United States Patent [19]
Desai et al.

[11] Patent Number: 5,524,252
[45] Date of Patent: Jun. 4, 1996

[54] PERSONAL COMPUTER SYSTEM COMBINED WITH AN ADAPTER FOR NETWORKS HAVING VARYING CHARACTERISTICS, AND ADAPTER FOR COUPLING A PERSONAL COMPUTER TO SUCH NETWORKS

[75] Inventors: Dhruv M. Desai, Boynton Beach; Lloyd H. Massman, Delray Beach; Bruce A. Smith, Jupiter, all of Fla.

[73] Assignee: International Business Machines Corporation, Armonk, N.Y.

[21] Appl. No.: 688,024

[22] Filed: Apr. 19, 1991

[51] Int. Cl.⁶ .................................................... G06F 13/00
[52] U.S. Cl. .................. 395/800; 395/200.20; 395/287; 379/447; 364/238.2; 364/242.92; 364/260.1; 364/DIG. 1
[58] Field of Search ..................................... 395/800, 325, 395/200, 275, 309, 287, 200.20, 200.18, 200.15; 379/90, 332, 353, 357, 446, 447; 375/8, 121; 361/331; 340/825.06, 825.08, 825.5

[56] References Cited

U.S. PATENT DOCUMENTS

| 4,217,624 | 8/1980 | Tuck ......................................... 361/394 |
| 4,504,901 | 3/1985 | Calvignac et al. ........................ 395/325 |
| 4,620,294 | 10/1986 | Leung et al. ............................... 375/46 |
| 4,748,656 | 5/1988 | Gibbs et al. ............................... 379/93 |
| 4,839,802 | 6/1989 | Wonak et al. ............................ 395/275 |
| 4,943,942 | 7/1990 | Dunnion ...................................... 375/8 |
| 4,964,154 | 10/1990 | Shimotono .............................. 379/100 |

FOREIGN PATENT DOCUMENTS

| 0282149 | 9/1988 | European Pat. Off. . |
| 0409622 | 1/1991 | European Pat. Off. . |
| 8800790 | 2/1988 | WIPO . |

OTHER PUBLICATIONS

D. Gulick: "What ISDN brings to the office of future" Data Communications, vol. 17, No. 8, Aug. 1988, pp. 151–159.

*Primary Examiner*—Eric Coleman
*Assistant Examiner*—Alpesh M. Shah
*Attorney, Agent, or Firm*—Anthony N. Magistrale; Daniel E. McConnell

[57] ABSTRACT

This invention relates to the adaptation of personal computers to communication through external networks, and more particularly to the ready adaptation of such computers to networks of varying characteristics, such as telecommunications networks located in various countries of the world. The adapter has first and second controllable digital/analog convertors for exchanging signals with a digital signal processor of the computer and controllable by a bus interface controller of the computer for converting signals between digital and analog forms. The adapter also has first and second connectors of the type required by the particular external network, coupled to the convertors for exchanging signals with the external network and for exchanging signals with an external device such as a telephone set.

17 Claims, 4 Drawing Sheets

PERSONAL COMPUTER SYSTEM COMBINED WITH AN ADAPTER FOR NETWORKS HAVING VARYING CHARACTERISTICS, AND ADAPTER FOR COUPLING A PERSONAL COMPUTER TO SUCH NETWORKS

FIELD AND BACKGROUND OF DISCLOSURE

This invention relates to the adaptation of personal computers to communication through external networks, and more particularly to the ready adaptation of such computers to networks of varying characteristics, such as telecommunications networks located in various countries of the world.

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. Many of these systems are designed primarily to give independent computing power to a single user and are inexpensively priced for purchase by individuals or small businesses. Others are intended to become network servers in Local Area Networks (LANs). Examples of such personal computer systems are IBM's PERSONAL COMPUTER AT and IBM's PERSONAL SYSTEM/2 Models 25, 30, L40SX, 50, 55, 65, 70, 80, 90 and 95.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. The Family I models typically have used the popular INTEL 8088 or 8086 microprocessor as the system processor. These processors have the ability to address one megabyte of memory. The Family II models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors.

Personal computers of the types described have heretofore been used to communicate over a number of different types of networks external to the personal computers. By way of example, it has become common to provide a modulator/demodulator ("modem") for communication by telephone networks. Such telephone networks may be the public switched telephone network common in the country of use of the system, or may be advanced telephone networks such as an integrated services digital network ("ISDN"), or the like. Typically, communication by modem is analog communication on the network side, consistent with the voice capabilities of the telephone lines used, and digital on the computer side. It has also become common to provide for communication among personal computers by a local area network ("LAN") or other network which is not primarily directed at voice communication among persons, as is the public switched telephone network. As will be appreciated, such networks having varying characteristics, specifically including varying requirements for physical connections, signal conditioning and safety. While this is particularly true of the public switched telephone networks of various countries (many of which have adopted standards for their national telephone systems distinctive from those of other countries), the problem exists for any of the types of networks mentioned above.

Heretofore, the adaptation of a personal computer to communication over a network has been accommodated by the use of an outboard accessory, such as a modem, or the use of an option card or accessory board added within the housing of the computer which functions similarly to the outboard accessory. Such accessories have typically been adapted to a specific network (analog or digital) by design and construction, and have only limited adaptability to other networks, if any. As a consequence, attempts to adapt personal computers to networks of varying characteristics have required a large number of types of adapters. For some types of networks, there is little demand for adapters, consequently such low demand adapters become difficult to obtain or expensive.

BRIEF DESCRIPTION OF THE INVENTION

With the foregoing in mind, it is an object of this invention to provide a personal computer adapted for communication over networks of varying characteristics. In realizing this object of the present invention, a personal computer is associated with an outboard adapter having digital analog convertors controllable by the personal computer for setting the characteristic response of the adapter to the interface with the external network.

A further object of this invention is to provide an adapter of the type described, in which digital/analog convertor elements may be controlled to accommodate particular network characteristics. In realizing this object of the present invention, the adapter provides any personal computer to which the adapter is connected with information identifying the adapter and enabling the computer to set the characteristics of the adapter as needed.

BRIEF DESCRIPTION OF THE DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
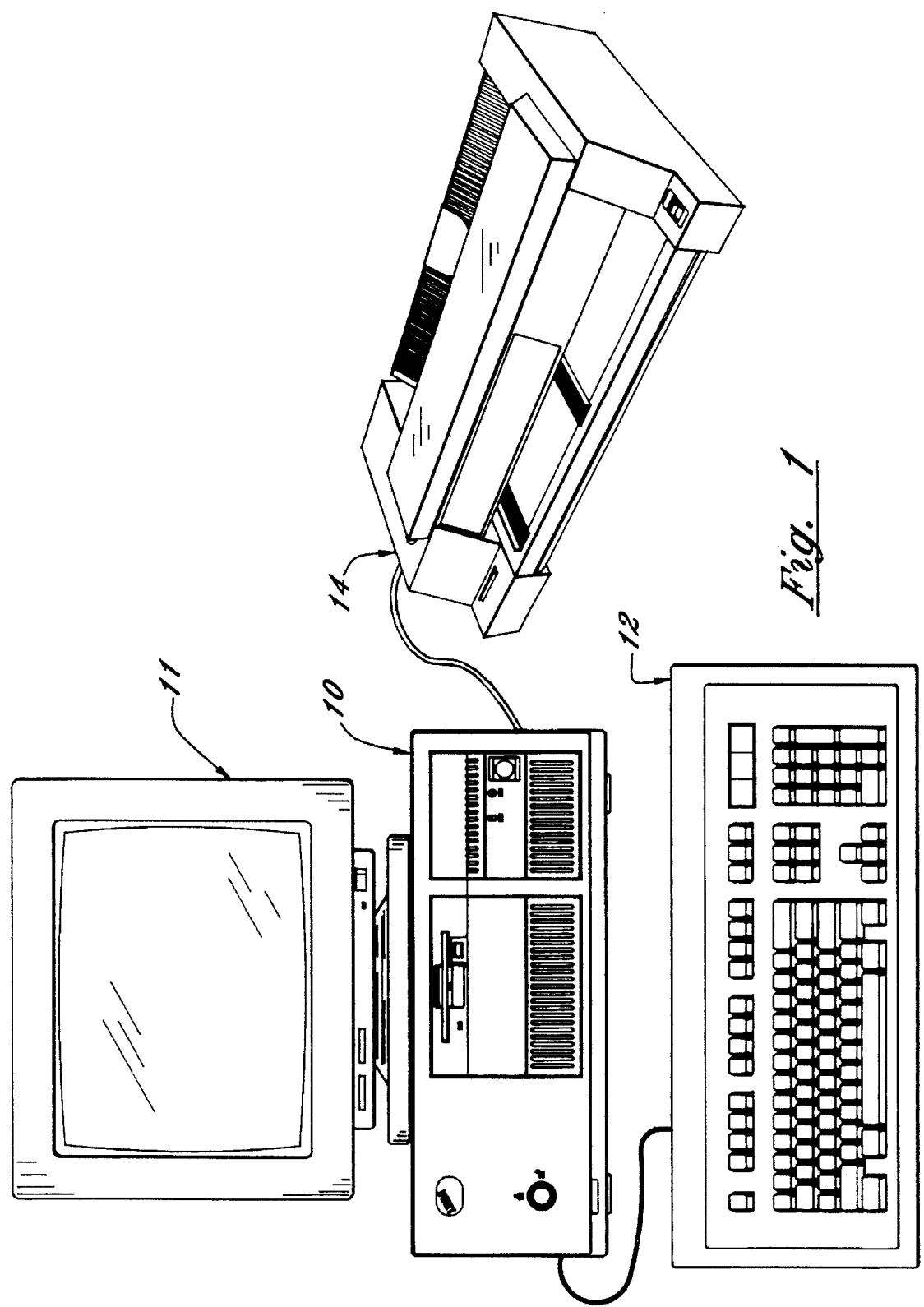
FIG. 1 is a perspective view of a personal computer embodying this invention.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. The computer 10 has a cover 15 cooperates with a chassis 19 in defining a housing enclosing a shielded volume for receiving electrically powered data processing and storage components for processing and storing digital data. At least certain of these components are mounted on a multilayer planar 20 or motherboard which is mounted on the chassis 19 and provides a means for electrically interconnecting the components of the computer 10 including those identified above and such other associated elements as floppy disk drives, various forms of direct access storage devices, accessory cards or boards, and the like.

Figure 2:
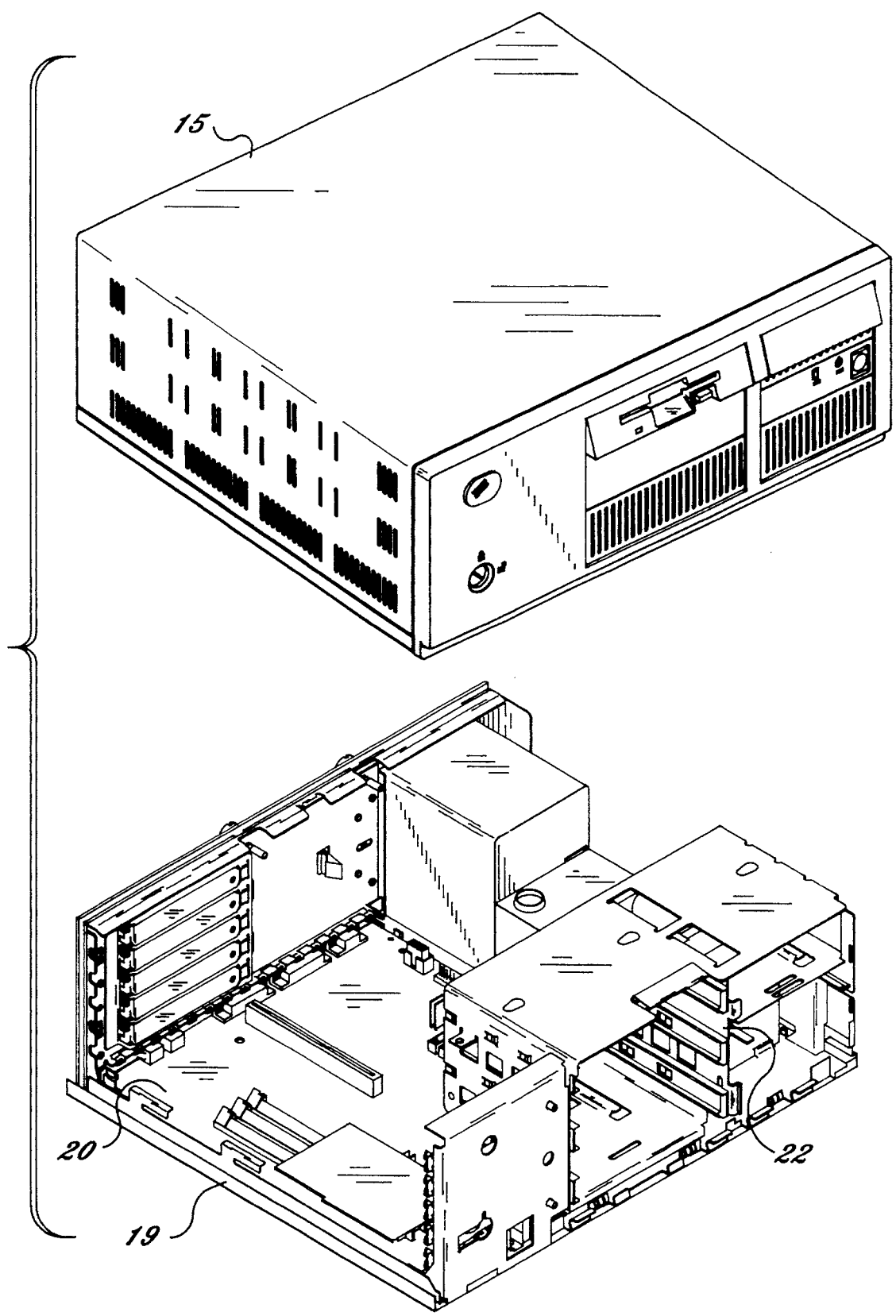
FIG. 2 is an exploded perspective view of certain elements of the personal computer of FIG. 1 including a chassis, a cover, and a planar board and illustrating certain relationships among those elements.

The chassis 19 has a base and a rear panel (FIG. 2) and defines at least one open bay for receiving a data storage device such as a disk drive for magnetic or optical disks, a tape backup drive, or the like. In the illustrated form, an upper bay 22 is adapted to receive peripheral drives of a first size (such as those known as 3.5 inch drives). A floppy disk drive, a removable media direct access storage device capable of receiving a diskette inserted thereinto and using the diskette to receive, store and deliver data as is generally known, may be provided in the upper bay 22.

Figure 3:
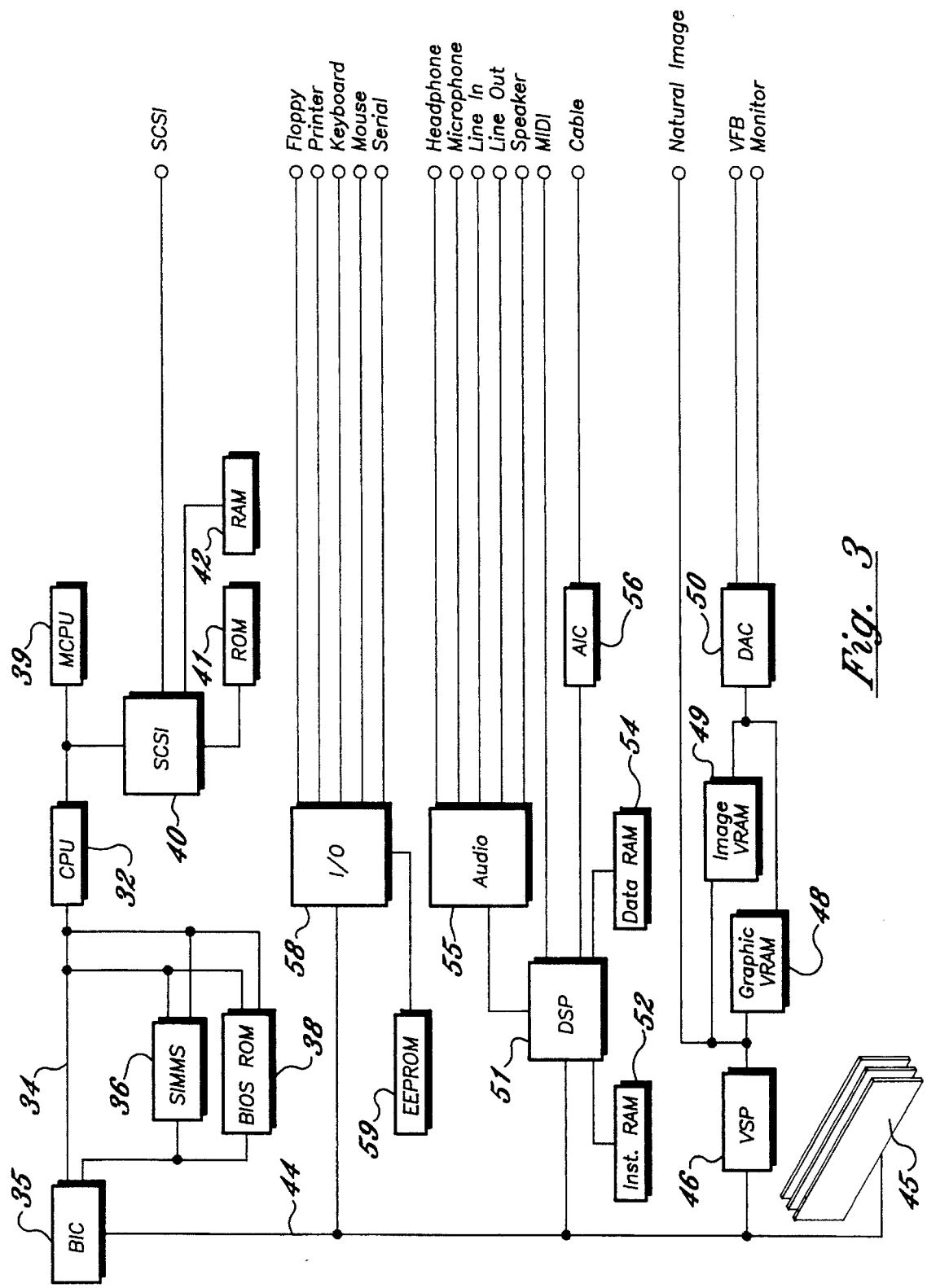
FIG. 3 is a schematic view of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 32. While any appropriate microprocessor can be used as the CPU 32, one suitable microprocessor is the 80386 which is sold by INTEL. The CPU 32 is connected by a high speed CPU local bus 34 to a bus interface control unit 35, to volatile random access memory (RAM) 36 here shown as Single Inline Memory Modules (SIMMs) and to BIOS ROM 38 in which is stored instructions for basic input/output operations to the CPU 32. The BIOS ROM 38 includes the BIOS that is used to interface between the I/O devices and the operating system of the microprocessor 32. BIOS stored in ROM 38 can be copied into RAM 36 to decrease the execution time of BIOS.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80286 or 80486 microprocessor.

Returning now to FIG. 3, the CPU local bus 34 (comprising data, address and control components) also provides for the connection of the microprocessor 32 with a math coprocessor 39 and a Small Computer Systems Interface (SCSI) controller 40. The SCSI controller 40 may, as is known to persons skilled in the arts of computer design and operation, be connected or connectable with Read Only Memory (ROM) 41, RAM 42, and suitable external devices of a variety of types as facilitated by the I/O connection indicated to the right in the Figure. The SCSI controller 40 functions as a storage controller in controlling storage memory devices such as fixed or removable media electromagnetic storage devices (also known as hard and floppy disk drives), electro-optical, tape and other storage devices.

The bus interface controller (BIC) 35 couples the CPU local bus 34 with an I/O bus 44. By means of the bus 44, the BIC 35 is coupled with an optional feature bus such as a MICRO CHANNEL bus having a plurality of I/O slots for receiving MICRO CHANNEL adapter cards 45 which may be further connected to an I/O device or memory (not shown). The I/O bus 44 includes address, data, and control components.

Coupled along the I/O bus 44 are a variety of I/O components such as a video signal processor 46 which is associated with video RAM (VRAM) for storing graphic information (indicated at 48) and for storing image information (indicated at 49). Video signals exchanged with the processor 46 may be passed through a Digital to Analog Converter (DAC) 50 to a monitor or other display device. Provision is also made for connecting the VSP 46 directly with what is here referred to as a natural image input/output, which may take the form of a video recorder/player, camera, etc. The I/O bus 44 is also coupled with a Digital Signal Processor (DSP) 51 which has associated instruction RAM 52 and data RAM 54 available to store software instructions for the processing of signals by the DSP 51 and data involved in such processing. The DSP 51 provides for processing of audio inputs and outputs by the provision of an audio controller 55, and for handling of other signals by provision of an analog interface controller 56. Lastly, the I/O bus 44 is coupled with a input/output controller 58 with associated Electrical Erasable Programmable Read Only Memory (EEPROM) 59 by which inputs and outputs are exchanged with conventional peripherals including floppy disk drives, a printer or plotter 14, keyboard 12, a mouse or pointing device (not shown), and by means of a serial port.

Figure 4:
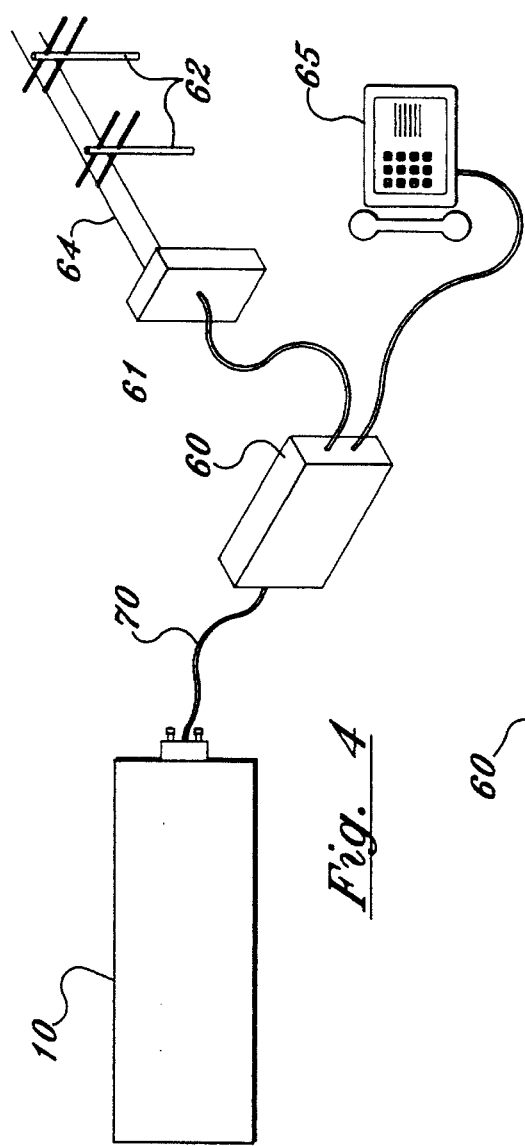
FIG. 4 is a schematic environmental view showing the personal computer of FIGS. 1 through 3 connected with the adapter of this invention and with an external network and an external device, shown as a public switched telephone network and a telephone set.

In accordance with this particular invention, the personal computer system 10 is connected with an adapter 60 (FIG. 4) by which communication is established with an external network (shown as a public switched telephone network indicated by a terminator block 61, poles 62 and lines 64) and with an external device (shown as a telephone handset 65). The adapter 60 has a housing and an elongate, flexible member 70 for communicating signals between the adapter 60 and the digital signal processor 51 of the personal computer system 10. While here illustrated for purposes of convenience with a single line, the knowledgeable reader will understand from the discussion which follows that the member 70 is, as used, a multiple conductor cable which is preferably connected with the computer 10 using a twenty six pin D shell connector.

The adapter is coupled by the flexible member 70 with first and second controllable digital/analog convertors 71 and 72 (housed, together with an adapter controller 84, within the analog interface controller 56, FIG. 3) for exchanging signals with the digital signal processor 51 and controllable by the bus interface controller 35 for converting signals between digital and analog forms.

The adapter also has first and second connectors of the type required by the particular external network. A first connector 74 is coupled to the convertors 71, 72 for exchanging signals with the external network 61, 62, 64 while a second connector 75 is coupled to the convertors for exchanging signals with an external device such as the telephone set 65.

Figure 5:
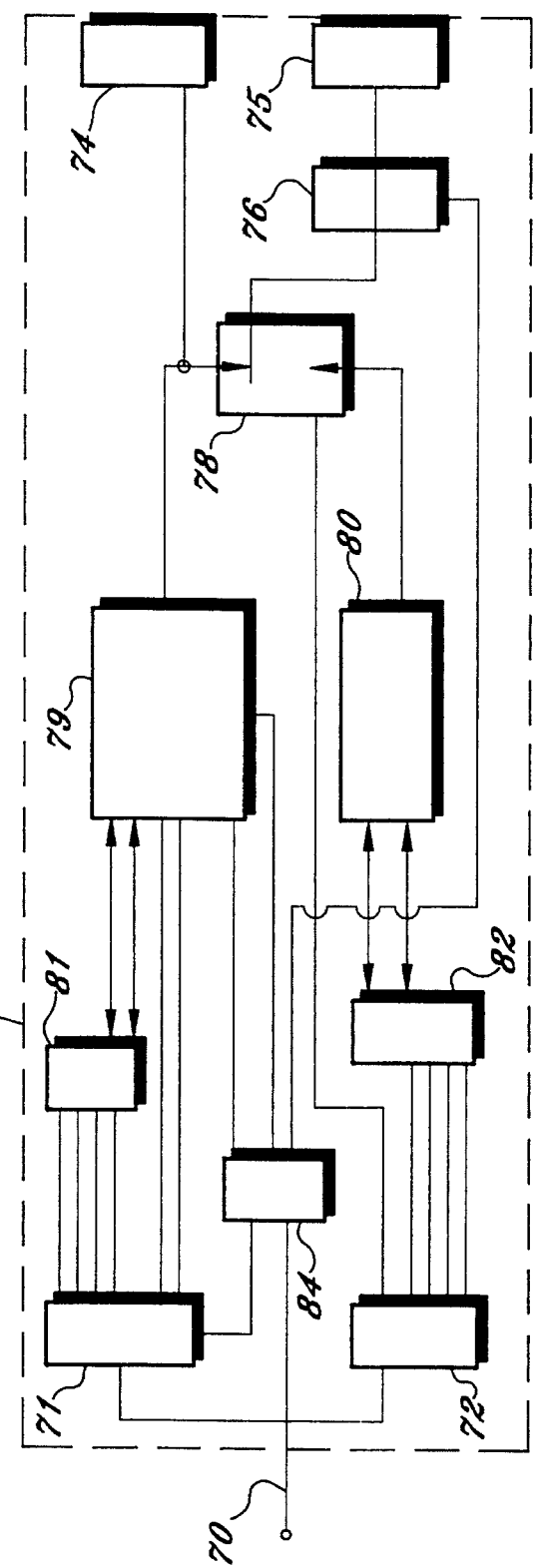
FIG. 5 is a schematic diagram of the components making up the adapter of FIG. 4.

The controllable convertors 71, 72, in accordance with this invention and under the control of the bus interface controller 35, enable exchange of signals between the connectors 74, 75 and thereby between the telephone network and the telephone set and also enable exchange between one of the connectors and the microprocessor 32 and thereby between the personal computer and the telephone network. One of the connectors (here shown as the connector 75 lowermost in FIG. 5) is preferably isolated from the remaining circuitry of the adapter 60 by a optical coupler 76. Such optical couplers are generally known and will not be here described in detail. Further, the isolated connector 75 is also connected by means of a relay 78 which permits selection of input to the computer 10 through a protective data/voice coupler 79 or a local loop driver device 80. Signals passing through either the data/voice coupler 79 or the local loop driver 80 are in analog form and transmitted over a two wire system, if the network 61, 62, 64 is a typical voice capability public switched telephone network. For that reason, the signals are provided to two to four convertors 81, 82. Such convertors are generally known in the telecommunications arts as hybrids. One two to four convertor 81 preferably is a high precision, low noise convertor particularly for data communications applications, while the other convertor 82 is a resistor network useful for recording and playback of voice frequencies.

In the preferred contemplated form for the invention, and as built before the preparation of this description, the controllable digital/analog convertors 71, 72 are analog interface controllers such as the products available from Texas Instruments under their part designation TLC32046. Such controllers communicate with the computer 10 through the DSP 51 and BIC 35 using a serial protocol and are capable of filtering analog signals, decoding control line drivers delivered through the DSP and BIC and controlling the operation of the controllers, and converting signals between analog and digital forms (from analog to digital and from digital to analog). The analog input/output lines of the controllers 71, 72 are connected with the hybrids 81, 82 described above. The digital input/output lines of the controllers 71, 72 are connected with the DSP 51 and possibly also with the audio signal processor 55. The controllers 71, 72 are also connected with a adapter controller 84 (mentioned above) through which control line drivers pass from the DSP and BIC and which governs the activate and inhibit status of the analog interface controllers.

The present invention contemplates that, for a public switched telephone network application, the first convertor 71 may receive and act on a lift hook or off hook signal, a dial loop signal, and a dial pulse signal directing certain actions of the convertor. The first convertor 71 may provide signals identifying the type of adapter presented and, by a set of data bits, a specific country or system identification. The second convertor 72 may be either enabled or inhibited by signals from the DSP and BIC and thus configured as an analog port (when enabled) or a digital port. When enabled, the second convertor 72 may be used to control input/output through the telephone set 65 and for identifying the state of the hook switch of that set. When inhibited, the second convertor provides a direct serial port connection to the external network from the computer 10, thus enabling direct digital signal transfer. While the second convertor 72 is in either state, the control over the operation of the first convertor 71 described above is maintained.

While here described and illustrated by an arrangement in which the controllable convertors 71, 72 and controller 84 are connected directly into the system of the computer 10, it will be understood that identical function can be obtained where the convertors 71, 72 and controller 84 are, in fact, mounted on an adapter card or accessory board mounted in the MICRO CHANNEL connectors provided, such as one of the card 45 illustrated in FIG. 3.

In the drawings and specifications there has been set forth a preferred embodiment of the invention and, although specific terms are used, the description thus given uses terminology in a generic and descriptive sense only and not for purposes of limitation.

What is claimed is:

1. A personal computer system combined with a communications adapter for communicating through external communications networks having varying characteristics and comprising:

said personal computer system having a housing and comprising;

a microprocessor within said housing and coupled directly to a high speed local processor data bus;

an input/output data bus;

a digital signal processor (DSP) within said housing and coupled directly to the input/output data bus;

a bus interface controller within said housing and coupled directly to the high speed data bus and directly to said input/output data bus for controlling communication between the high speed data bus and said input/output data bus, said bus interface controller providing for (a) arbitration among said microprocessor and any other master devices coupled directly to said high speed local bus for grant of access to said high speed local bus, and (b) arbitration among said DSP and any other devices coupled directly to said input/output data bus and said high speed local bus for grant of access to said input/output data bus;

a controllable digital/analog (D/A) convertor within said housing and coupled to said DSP for exchanging signals with said digital signal processor and controllable by said bus interface controller for converting signals from digital form to analog form and from analog form to digital form; and said communications adapter outside said housing and comprising:

an elongate, flexible member for communicating signals between said communications adapter and said personal computer system;

a first connector coupled to said flexible member at an end thereof remote from said housing and coupled by said flexible member to said D/A convertor for exchanging signals with an external communications network; and a second connector coupled to said flexible member at an end thereof remote from said housing and coupled by said flexible member to said D/A convertor for exchanging signals with an external device;

said D/A convertor, under the control of said bus interface controller, enabling exchange of signals (a) between said first and second connectors and (b) between one of said connectors and said microprocessor.

2. A personal computer according to claim 1 wherein said D/A convertor is an analog interface controller capable of serial communication with said digital signal processor.

3. A personal computer according to claim 1 wherein said D/A convertor is an analog interface controller settable by said bus interface controller and said DSP into a selected one of (a) an active state in which the analog interface controller converts analog signals received from one of said connectors into digital signals which are passed to said digital signal processor and converts digital signals received from said digital signal processor into analog signals which are passed to said one of said connectors and (b) an inhibited state in which digital signals received from said one of said connectors and from said digital signal processor are passed as received.

4. A personal computer system according to claim 3, further including an adapter controller within said housing and coupled to said bus interface controller, said DSP and said D/A convertors for setting said D/A convertor into said selected one of said active state or said inhibited state.

5. A personal computer according to claim 1 wherein said communications adapter further comprises a component for signalling to said digital signal processor information identifying the network characteristics which can be matched by said communications adapter.

6. A personal computer system according to claim 1, wherein said D/A convertor is coupled directly to said digital signal processor.

7. A personal computer system according to claim 1, wherein said D/A convertor is coupled to said input/output bus.

8. A personal computer system combined with a communications adapter for communicating through external communications networks having varying characteristics and comprising:

said personal computer system having a housing and comprising;
 a microprocessor within said housing and coupled directly to a high speed local processor data bus;
 an input/output data bus;
 a digital signal processor (DSP) within said housing and coupled directly to the input/output data bus;
 a bus interface controller within said housing and coupled directly to the high speed data bus and directly to said input/output data bus for controlling communication between the high speed data bus and said input/output data bus, said bus interface controller providing for (a) arbitration among said microprocessor and any other master devices coupled directly to said high speed local bus for grant of access to said high speed local bus, and (b) arbitration among said DSP and any other devices coupled directly to said input/output data bus and said high speed local bus for grant of access to said input/output data bus;
 a first controllable digital/analog (D/A) convertor within said housing and coupled to said DSP for exchanging signals with said digital signal processor and controllable by said bus interface controller for converting signals from digital form to analog form and from analog form to digital form;
 a second controllable digital/analog (D/A) convertor within said housing and coupled to said DSP for exchanging signals with said digital signal processor and controllable by said bus interface controller for converting signals from digital form to analog form and from analog form to digital form; and said telecommunications adapter outside said housing and comprising:
 an elongate, flexible member for communicating signals between said telecommunications adapter and said personal computer system;
 a first connector coupled to said flexible member at an end thereof remote from said housing and coupled by said flexible member to at least one of said first and second D/A convertors for exchanging signals with an external communications network; and
 a second connector coupled to said flexible member at an end thereof remote from said housing and coupled by said flexible member to at least one of said first and second D/A convertors for exchanging signals with an external device;
said first and second D/A convertors, under the control of said bus interface controller, enabling exchange of signals (a) between said first and second connectors and (b) between one of said connectors and said microprocessor.

9. A personal computer according to claim 8 wherein each of said first and second D/A convertors is an analog interface controller capable of serial communication with said digital signal processor.

10. A personal computer according to claim 8 wherein each of said D/A convertors is an analog interface controller settable by said bus interface controller and said DSP into a selected one of (a) an active state in which the analog interface controller converts analog signals received from one of said connectors into digital signals which are passed to said digital signal processor and converts digital signals received from said digital signal processor into analog signals which are passed to said one of said connectors and (b) an inhibited state in which digital signals received from said one of said connectors and from said digital signal processor are passed as received.

11. A personal computer system according to claim 10, further including an adapter controller within said housing and coupled to said bus interface controller, said DSP and said D/A convertors for setting said D/A convertor into said selected one of said active state or said inhibited state.

12. A personal computer according to claim 8 wherein said telecommunications adapter further comprises a component for signalling to said digital signal processor information identifying the network characteristics which can be matched by said telecommunications adapter.

13. A personal computer system combined with a communications adapter for communicating through public switched telephone networks having varying characteristics and comprising:

said personal computer system having a housing and comprising;
 a microprocessor within said housing and coupled directly to a high speed local processor data bus;
 an input/output data bus;
 a digital signal processor (DSP) within said housing and coupled directly to the input/output data bus;
a bus interface controller within said housing and coupled directly to the high speed data bus and directly to said input/output data bus for controlling communication between the high speed data bus and said input/output data bus, said bus interface controller providing for (a) arbitration among said microprocessor and any other master devices coupled directly to said high speed local bus for grant of access to said high speed local bus, and (b) arbitration among said DSP and any other devices coupled directly to said input/output data bus and said high speed local bus for grant of access to said input/output data bus;

a first controllable digital/analog (D/A) convertor within said housing and coupled to said DSP for exchanging signals with said digital signal processor and controllable by said bus interface controller for converting signals from digital form to analog form and from analog form to digital form;

a second controllable digital/analog (D/A) convertor within said housing and coupled to said DSP for exchanging signals with said digital signal processor and controllable by said bus interface controller for converting signals from digital form to analog form and from analog form to digital form; and said telecommunications adapter outside said housing and comprising:

an elongate, flexible member for communicating signals between said telecommunications adapter and said personal computer system;

a first connector coupled to said flexible member at an end thereof remote from said housing and coupled by said flexible member to at least one of said first and second D/A convertors for exchanging signals with a telephone network; and a second connector coupled to said flexible member at an end thereof remote from said housing and coupled by said flexible member to at least one of said first and second D/A convertors for exchanging signals with an external telephone set;

said first and second D/A convertors, under the control of said bus interface controller, enabling exchange of signals (a) between said first and second connectors and (b) between one of said connectors and said microprocessor.

14. A personal computer according to claim 13 wherein each of said first and second D/A convertors is an analog interface controller capable of serial communication with said digital signal processor.

15. A personal computer according to claim 13 wherein (a) each of said D/A convertors is an analog interface controller settable by said bus interface controller and said DSP into an active state in which said analog interface controller converts analog signals received from one of said connectors into digital signals which are passed to said digital signal processor and converts digital signals received from said digital signal processor into analog signals which are passed to said one of said connectors and further wherein (b) at least one of said D/A convertors is settable by said bus interface controller and said DSP into an inhibited state in which digital signals received from said one of said connectors and from said digital signal processor are passed as received.

16. A personal computer according to claim 13 wherein said telecommunications adapter further comprises a component for signalling to said digital signal processor information identifying the network characteristics which can be matched by said telecommunications adapter.

17. A personal computer system combined with a communications adapter for communicating through public switched telephone networks having varying characteristics and comprising:

said personal computer system having a housing and comprising;

a microprocessor within said housing and coupled directly to a high speed local processor data bus;

an input/output data bus;

a digital signal processor (DSP) within said housing and coupled directly to the input/output data bus;

a bus interface controller within said housing and coupled directly to the high speed data bus and directly to said input/output data bus for controlling communication between the high speed data bus and said input/output data bus, said bus interface controller providing for (a) arbitration among said microprocessor and any other master devices coupled directly to said high speed local bus for grant of access to said high speed local bus, and (b) arbitration among said DSP and any other devices coupled directly to said input/output data bus and said high speed local bus for grant of access to said input/output data bus;

a first controllable analog interface controller within said housing and coupled to said DSP for serial exchange of signals with said digital signal processor and controllable by said bus interface controller for converting signals from digital form to analog form and from analog form to digital form;

a second controllable analog interface controller within said housing and coupled to said DSP for serial exchange of signals with said digital signal processor and controllable by said bus interface controller for converting signals from digital form to analog form and from analog form to digital form; and said telecommunications adapter outside said housing and comprising:

an elongate, flexible member for communicating signals between said telecommunications adapter and said personal computer system;

a first connector coupled to said flexible member at an end thereof remote from said housing and coupled by said flexible member to said first and second interface controllers for exchanging signals with the telephone network;

a second connector coupled to said flexible member at an end thereof remote from said housing and coupled by said flexible member to said first and second interface controllers for exchanging signals with an external telephone set;

said first and second interface controllers, under the control of said bus interface controller, enabling exchange of signals between said first and second connectors and thereby between the telephone network and the telephone set and enabling exchange between one of said connectors and said microprocessor and thereby between the personal computer and the telephone network; and a component for signalling to said digital signal processor information identifying the network characteristics which can be matched by said telecommunications adapter;

both of said interface controllers being settable into an active state in which each said interface controllers (a) converts analog signals received from one of said connectors into digital signals which are passed to said digital signal processor and (b) converts digital signals received from said digital signal processor into analog signals which are passed to said one of said connectors, and at least one of said interface controllers is settable into an inhibited state in which digital signals received from said one of said connectors and from said digital signal processor are passed as received.

* * * * *